United States Patent
De Soccio

(10) Patent No.: US 12,297,882 B2
(45) Date of Patent: May 13, 2025

(54) BLOCKS FOR WHEEL BRAKES

(71) Applicant: COFREN S.R.L, Avellino (IT)

(72) Inventor: Vittorio De Soccio, Benevento (IT)

(73) Assignee: COFREN S.R.L, Avellino (IT)

( * ) Notice: Subject to any disclaimer, the term of this patent is extended or adjusted under 35 U.S.C. 154(b) by 0 days.

(21) Appl. No.: 17/798,475

(22) PCT Filed: Jan. 26, 2022

(86) PCT No.: PCT/IB2022/050678
§ 371 (c)(1),
(2) Date: Aug. 9, 2022

(87) PCT Pub. No.: WO2022/162553
PCT Pub. Date: Aug. 4, 2022

(65) Prior Publication Data
US 2023/0349437 A1    Nov. 2, 2023

(30) Foreign Application Priority Data
Jan. 26, 2021   (IT) .................. 102021000001469

(51) Int. Cl.
*F16D 69/04*   (2006.01)
*F16D 65/06*   (2006.01)
(Continued)

(52) U.S. Cl.
CPC ....... *F16D 69/0416* (2013.01); *F16D 65/062* (2013.01); *F16D 65/807* (2013.01); *F16D 2065/788* (2013.01); *F16D 2069/0433* (2013.01)

(58) Field of Classification Search
CPC .. F16D 69/0416; F16D 65/062; F16D 65/807; F16D 2069/0425; F16D 2069/0433; F16D 2065/788
(Continued)

(56) References Cited

U.S. PATENT DOCUMENTS

| | | | | |
|---|---|---|---|---|
| 2,094,273 A | * | 9/1937 | Mack | F16D 65/062 188/243 |
| 2,095,427 A | * | 10/1937 | Williams | F16D 65/062 188/221.1 |

(Continued)

FOREIGN PATENT DOCUMENTS

| | | |
|---|---|---|
| DE | 200797 C | 7/1908 |
| EP | 1111263 A2 | 6/2001 |

(Continued)

OTHER PUBLICATIONS

International Search Report and Written Opinion for International Application No. PCT/IB2022/050678 (12 pages).

(Continued)

*Primary Examiner* — Thomas J Williams
(74) *Attorney, Agent, or Firm* — K&L Gates LLP

(57) ABSTRACT

A block for wheel brakes comprising a friction portion, in which a friction surface is defined, which, in use, acts upon a peripheral surface of a wheel in order to carry out the braking action, a support plate, which is fixed, in an irreversible manner, to a surface of the friction portion opposite the friction surface, and a base plate, which is fixed to the support plate and comprises a coupling element to fix the block as a whole to a brake system. The block comprises at least one elastic element placed between the support plate and the base plate. The presence of the elastic element creates a ventilation air space between the support plate and the base plate.

11 Claims, 2 Drawing Sheets

(51) Int. Cl.
*F16D 65/807* (2006.01)
*F16D 65/78* (2006.01)

(58) Field of Classification Search
USPC .................. 188/250 E, 250 F, 250 B, 251 R
See application file for complete search history.

(56) References Cited

U.S. PATENT DOCUMENTS

| | | | |
|---|---|---|---|
| 6,494,301 B1 * | 12/2002 | Wirth | F16D 65/092 |
| | | | 188/259 |
| 2003/0075400 A1 * | 4/2003 | Wirth | F16D 65/092 |
| | | | 188/250 B |
| 2009/0152782 A1 * | 6/2009 | Larson | G05G 5/05 |
| | | | 267/158 |
| 2019/0120307 A1 | 4/2019 | Schlauss et al. | |
| 2023/0349437 A1 * | 11/2023 | De Soccio | F16D 65/807 |

FOREIGN PATENT DOCUMENTS

| | | | | |
|---|---|---|---|---|
| EP | 3059466 A1 | | 8/2016 | |
| EP | 3650727 A1 * | | 5/2020 | ........... F16D 55/225 |
| GB | 2046378 A * | | 11/1980 | ............... B61H 1/00 |
| JP | H0942335 A * | | 2/1997 | |
| WO | 2000014426 A1 | | 3/2000 | |

OTHER PUBLICATIONS

Search Report for priority Italian Application No. 202100001469 (6 pages).

* cited by examiner

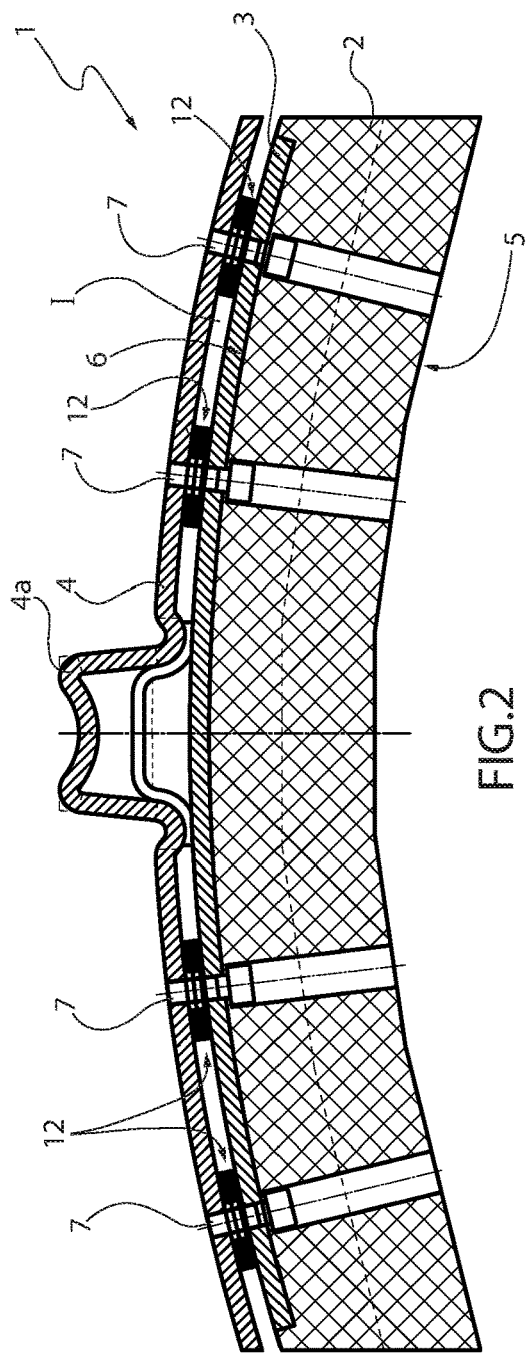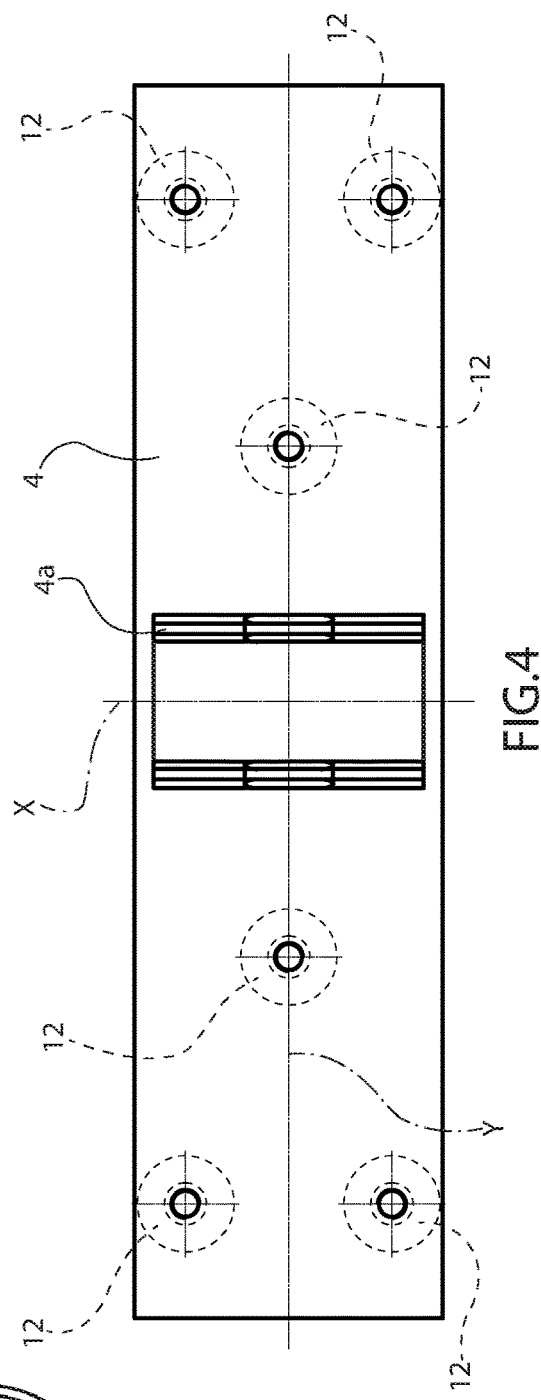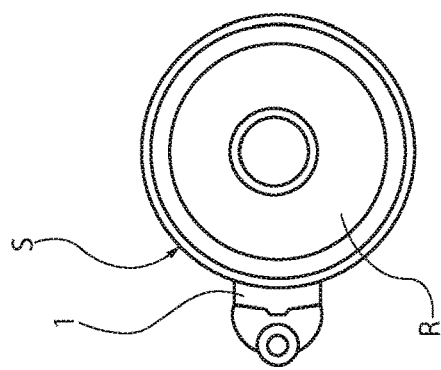

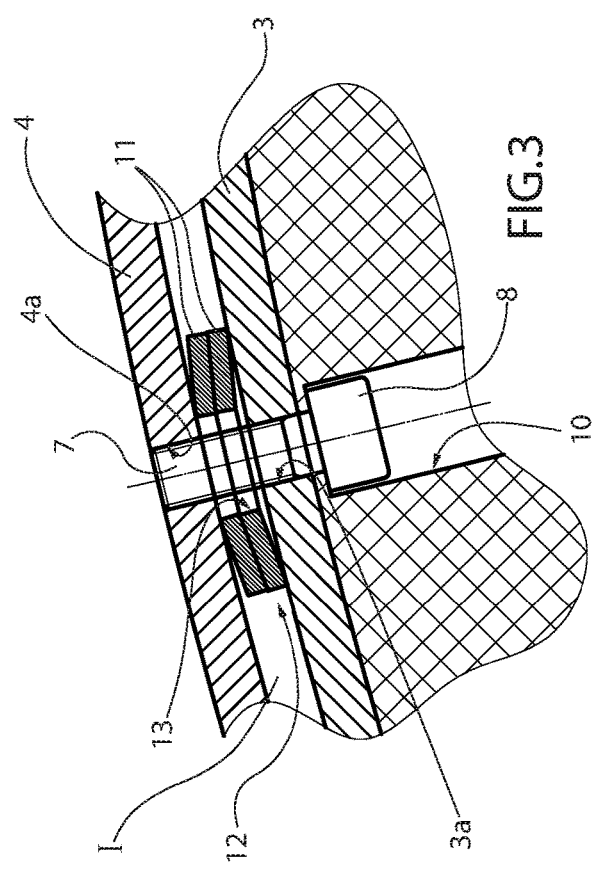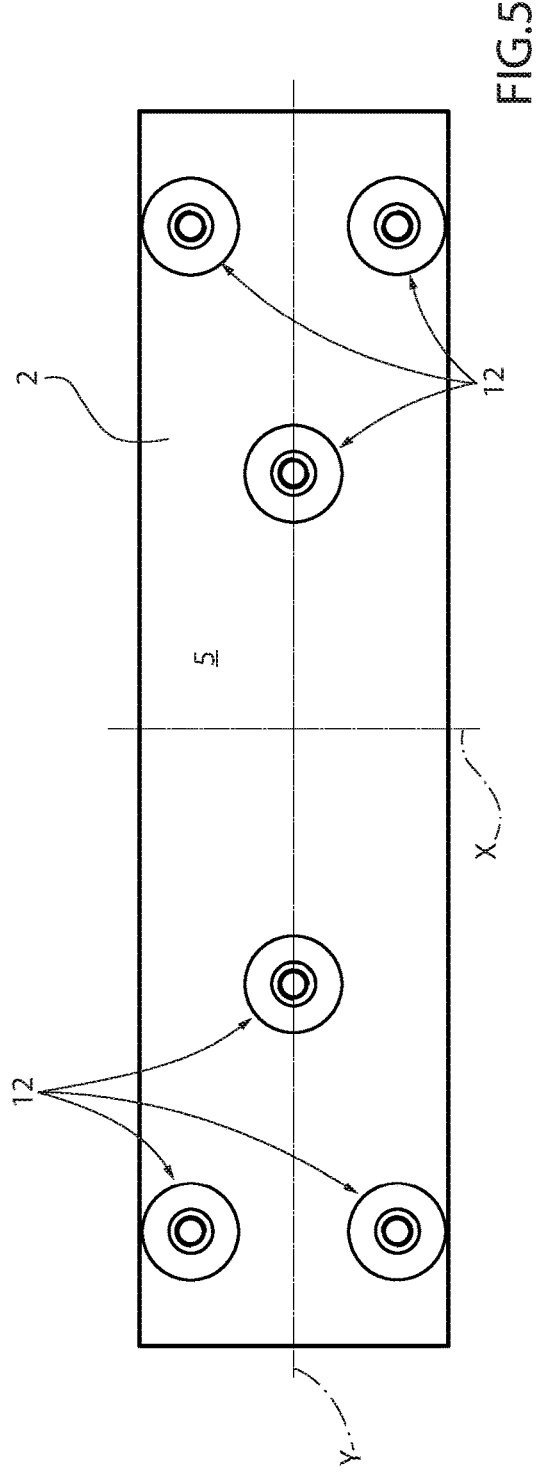

BLOCKS FOR WHEEL BRAKES

CROSS-REFERENCE TO RELATED APPLICATIONS

This patent application is a national phase entry of and claims priority to International Patent Application No. PCT/IB2022/050678 (filed 26 Jan. 2022), which claims priority from Italian patent application no. 102021000001469 (filed 26 Jan. 2021), the entire disclosures of which are incorporated herein by reference.

BACKGROUND

Technical Field

The invention relates to blocks for wheel brakes to be used in railways.

The brakes to which the invention applies operate by means of a friction action directly exerted upon the wheel of the train. In particular, the blocks of the invention act upon the peripheral surface of the wheel, which, in use, is in contact with the rail. For this reason, the blocks have a curved friction surface to create a contact surface that is as large as possible with the peripheral surface of the wheel.

Discussion of Art

This type of brakes is clearly different from disc brakes, in which the braking is carried out through the action of friction elements upon an element on the outside of the wheel (the disc), but integral to it.

In the railway industry, the aforesaid blocks for wheel brakes are usually used in trains with an average/low speed (a maximum speed of 160 Km/h), with large masses and subjected to frequent braking, such as city trains.

One of the problems the railway industry must deal with is that of ensuring an even friction between the friction surface of the block and the peripheral surface of the wheel upon which the block acts. As a person skilled in the art knows, natural deformations arising on the peripheral surface of the wheel during use, even though small, cause a reduction of the contact surface between the friction surface of the block and the peripheral surface of the wheel. This reduction of the contact surface generates vibrations, which necessarily increase the braking noise and lead to thermal stresses of the wheel.

Another problem arising from the use of blocks for railway brakes on a wheel relates to the overheating to which the block is subjected during the braking action. As a person skilled in the art immediately understands, since the block necessarily transfers heat to the wheel, an overheating thereof can be extremely dangerous for the correct wheel—rail sliding. Indeed, if the wheel is subjected to an excess thermal stress, the wheel can undergo deformations that can jeopardize the correct rolling of the wheel on the rail, with obvious consequences in terms of safety.

Therefore, a solution is needed, which ensures a more even coupling between the friction surface of the block and the peripheral surface of the wheel and, at the same time, counters the overheating of the block and, hence, of the peripheral surface upon which the block acts while braking.

BRIEF DESCRIPTION

The inventor of this invention conceived a new type of block capable of fulfilling the aforesaid need.

The subject-matter of the invention is a block for wheel brakes comprising (i) a friction portion, in which a friction surface is defined, which is arranged so as to act upon a peripheral surface of a wheel in order to carry out the braking action; said peripheral surface being, in use, in contact with a rail; (ii) a support plate, which is fixed, in an irreversible manner, to a surface of said friction portion opposite said friction surface; and (iii) a base plate, which is fixed to said support plate and comprises a coupling element to fix the block as a whole to a brake system; said block being characterized in that it comprises at least one elastic element placed between said support plate and said base plate; said elastic element creating a ventilation air space between said support plate and said base plate.

Preferably, the block according to the invention comprises a plurality of elastic elements placed between said support plate and said base plate.

Preferably, said elastic elements are arranged in a symmetric manner relative both to a transverse symmetry axis and to a longitudinal symmetry axis of said friction surface.

Preferably, said elastic elements consist of Belleville washers. Preferably, each one of the elastic elements consists of a plurality of Belleville washers.

Preferably, said support plate and said base plate are coupled to one another by means of a plurality of bolts, each engaging a hole of one or more Belleville washers.

BRIEF DESCRIPTION OF THE DRAWINGS

Hereinafter there is a description of an embodiment of the invention, by mere way of explanatory and non-limiting example, with reference to the accompanying drawings, wherein:

FIG. 1 shows, with parts removed for greater clarity, the assembly consisting of a block according to the invention and a railway wheel upon which the block acts;

FIG. 2 is a side view of an embodiment of a block for wheel brakes according to the invention;

FIG. 3 is an enlargement of a detail of FIG. 2;

FIG. 4 is a rear view of the block of FIG. 2 with transparent parts; and FIG. 5 is a front view of the block of FIG. 2.

DETAILED DESCRIPTION

In FIGS. 1, 2, 4 and 5, number 1 indicates, as a whole, a block for wheel brakes according to the invention.

The block 1 comprises a friction portion 2, a support plate 3, which is fixed to the friction portion 2 in an irreversible manner, and a base plate 4, which is fixed to the support plate 3 in a reversible manner.

The friction portion 2 can be made of an organic material or of a sintered material and comprises a friction surface 5, which is arranged to act upon a peripheral surface S of a wheel R to carry out the braking action. The peripheral surface S upon which the friction surface 5 acts is, in use, in contact with a rail through rolling.

The support plate 3 is fixed to the friction portion 2 in an irreversible manner. In particular, the support plate 3 is fixed on a surface 6 of the friction portion 2 opposite the friction surface 5.

The base plate 4 is coupled to the support plate 3 in a reversible manner through the action of a plurality of bolts 7, each of which has an uncoupling end 8 housed inside a hole 10 made in said friction portion 2 and on which to intervene to uncouple said support plate 3 from said base plate 4.

In this way, the support plate 3 can easily be uncoupled from the base plate 4 for a possible replacement of the parts of the block 1.

The base plate 4 comprises a coupling portion 4a, which is useful to fix the block 1 to a brake system of the train.

The block 1 comprises a plurality of Belleville washers 11 interposed between the support plate 3 and the base plate 4.

The presence of the Belleville washers 11 between the support plate 3 and the base plate 4 creates a ventilation air space I, which has the purpose of ensuring a ventilation effect on the rear surface of the friction portion 2 as well as an improvement of the dissipation of the heat generated on the wheel by the friction portion 2 itself.

In particular, the Belleville washers 11 of the example shown herein are twelve and are arranged in six pairs 12, each shown in FIG. 2 in an enlargement.

Each one of the pairs 12 of Belleville washers 11 constitutes an elastic element according to the invention. Unlike what is shown in the example, the elastic elements can be different from Belleville washers.

The Belleville washer pairs 12 are arranged in a symmetric manner both relative to a transverse axis X and relative to a longitudinal axis Y of the friction surface 5.

The way in which the Belleville washers 11 of a pair are coupled is not relevant for the purposes of the invention.

According to FIG. 3, one of the bolts 7 engages a hole 3a made in the support plate 3 and a hole 4a made in the base plate 4. Furthermore, each one of the bolts 7 engages the holes 13 of the Belleville washers 11 of a same pair 12.

The block according to the invention, thanks to the presence of the elastic elements, can adapt itself to the peripheral surface of the wheel upon which it acts, despite the presence of the irregularities that tend to form. By so doing, there is a continuous friction action between the friction surface 5 of the friction portion 2 of the block 1 and the peripheral surface S of the wheel R upon which the block 1 acts.

Ensuring a constant friction action leads to significant advantages in terms of vibration, braking noise, and thermal stresses of the wheel. To better assess the advantage in terms of noise, it should be pointed out that medium/low speed trains, on which the blocks for wheel brakes are usually used, generally travel through city centres with a high population density and where problems due to the noise generated by transportation means are very present.

In combination with the continuous friction action between block and wheel, the technical solution of the invention ensures a ventilation and heat dissipation effect, with advantages in terms of life of the block and of preservation of the wheel associated with it.

In other words, the invention entails a special use of the elastic elements in the blocks for railway wheel brakes, which leads to a double advantage: on the one hand, there is a constant friction action between the friction portion of the block and the peripheral surface of the wheel, and, on the other hand, there is a ventilation and heat dissipation effect deriving from the friction action itself.

The advantages discussed above help create a block for railway wheel brakes with improved features in terms of effectiveness, life of the components and safety.

The invention claimed is:

1. A block for wheel brakes comprising:
    a friction portion in which a friction surface is defined, which is arranged so as to act upon a peripheral surface of a wheel to carry out a braking action, the peripheral surface being in contact with a rail during use of the friction portion;
    a support plate fixed in an irreversible manner to a surface of the friction portion opposite the friction surface;
    a base plate fixed to the support plate and comprising a coupling element to fix the block as a whole to a brake system, the block comprising a plurality of elastic elements placed between the support plate and the base plate, the elastic elements creating a ventilation air space between the support plate and the base plate;
    wherein the elastic elements include Belleville washers.

2. The block for the wheel brakes according to claim 1, wherein the elastic elements are arranged in a symmetric manner relative both to a transverse symmetry axis and to a longitudinal symmetry axis of the friction surface.

3. The block for the wheel brakes according to claim 1, wherein each of the elastic elements includes a plurality of the Belleville washers.

4. The block for the wheel brakes according to claim 1, wherein the base plate is coupled to the support plate in a reversible manner through action of a plurality of bolts, each of the bolts having an uncoupling end housed inside a hole made in the friction portion and on which to intervene to uncouple the support plate from the base plate.

5. The block for the wheel brakes according to claim 1, wherein each of the bolts engages a hole in one or more Belleville washers.

6. A block for wheel brakes comprising:
    a friction portion in which a friction surface is defined, which is arranged so as to act upon a peripheral surface of a wheel to carry out a braking action, the peripheral surface being in contact with a rail during use of the friction portion;
    a support plate fixed in an irreversible manner to a surface of the friction portion opposite the friction surface; and
    a base plate fixed to the support plate and comprising a coupling element to fix the block as a whole to a brake system, the block comprising at least one elastic element placed between the support plate and the base plate, the elastic element creating a ventilation air space between the support plate and the base plate,
    wherein the base plate is coupled to the support plate in a reversible manner through action of a plurality of bolts, each of the bolts having an uncoupling end housed inside a hole made in the friction portion and on which to intervene to uncouple the support plate from the base plate.

7. The block for the wheel brakes according to claim 6, further comprising a plurality of elastic elements placed between the support plate and the base plate.

8. The block for the wheel brakes according to claim 7, wherein the elastic elements are arranged in a symmetric manner relative both to a transverse symmetry axis and to a longitudinal symmetry axis of the friction surface.

9. The block for the wheel brakes according to claim 7, wherein the elastic elements include Belleville washers.

10. The block for the wheel brakes according to claim 9, wherein each of the elastic elements includes a plurality of the Belleville washers.

11. The block for the wheel brakes according to claim 6, wherein each of the bolts engages a hole in one or more Belleville washers.

* * * * *